(12) United States Patent
Kasai

(10) Patent No.: US 7,845,459 B2
(45) Date of Patent: Dec. 7, 2010

(54) ELECTRIC POWER STEERING APPARATUS AND METHOD FOR CONTROLLING THE ELECTRIC POWER STEERING APPARATUS

(75) Inventor: Eiji Kasai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 388 days.

(21) Appl. No.: 12/096,649

(22) PCT Filed: Jun. 6, 2007

(86) PCT No.: PCT/IB2007/001498

§ 371 (c)(1),
(2), (4) Date: Jun. 9, 2008

(87) PCT Pub. No.: WO2007/141634

PCT Pub. Date: Dec. 13, 2007

(65) Prior Publication Data

US 2008/0277191 A1 Nov. 13, 2008

(30) Foreign Application Priority Data

Jun. 6, 2006 (JP) .............................. 2006-156817

(51) Int. Cl.
*B62D 5/04* (2006.01)
*B62D 5/30* (2006.01)
*H02P 21/00* (2006.01)

(52) U.S. Cl. .................. 180/443; 180/407; 318/400.02

(58) Field of Classification Search ................. 180/443, 180/407; 318/139, 400.02, 488, 489; 323/234, 323/282

See application file for complete search history.

(56) References Cited

U.S. PATENT DOCUMENTS

| 5,780,980 A | * | 7/1998 | Naito ......................... 318/139 |
| 6,727,669 B2 | * | 4/2004 | Suzuki et al. ............... 318/139 |
| 6,992,448 B2 | * | 1/2006 | Fujimoto et al. ........ 318/400.02 |
| 7,102,305 B2 | * | 9/2006 | Suzuki ................... 318/400.02 |
| 7,102,314 B2 | * | 9/2006 | Hayashi ................. 318/400.21 |
| 7,176,646 B2 | * | 2/2007 | Iwazawa ..................... 318/432 |
| 7,215,034 B2 | * | 5/2007 | Hino et al. ................ 290/40 C |
| 7,227,332 B2 | * | 6/2007 | Suzuki et al. ................ 320/104 |

(Continued)

FOREIGN PATENT DOCUMENTS

DE 198 07 024 8/1998

(Continued)

*Primary Examiner*—Anne Marie M Boehler
*Assistant Examiner*—Daniel Yeagley
(74) *Attorney, Agent, or Firm*—Oblon, Spivak, McClelland, Maier & Neustadt, L.L.P.

(57) ABSTRACT

An electric power steering apparatus includes an electric power supply device that includes a main electric power unit that supplies high-tension electric power and a sub-electric power supply unit that supplies low-tension electric power, the main electric power unit and the sub-electric power supply unit being connected to each other in parallel, and that supplies electric power to the electric motor from one of the main electric power supply unit and the sub-electric power supply unit. An assist ECU calculates a correction coefficient based on which a d-axis target current increases with a decrease in voltage output from the electric power supply device, and calculates a final corrected d-axis target current by multiplying the d-axis target current by the correction coefficient.

7 Claims, 9 Drawing Sheets

U.S. PATENT DOCUMENTS

| | | | |
|---|---|---|---|
| 7,304,444 B2 * | 12/2007 | Takano et al. | 318/34 |
| 7,694,777 B2 * | 4/2010 | Yamashita et al. | 180/443 |
| 2004/0217729 A1 | 11/2004 | Recker | |

FOREIGN PATENT DOCUMENTS

| | | |
|---|---|---|
| JP | 9-20263 A | 1/1997 |
| JP | 2000 184766 | 6/2000 |
| JP | 2000 236626 | 8/2000 |
| JP | 2001-18822 A | 1/2001 |
| JP | 2001-161099 A | 6/2001 |
| JP | 2002-218799 A | 8/2002 |
| JP | 2004 166441 | 6/2004 |
| JP | 2006-117142 A | 5/2006 |
| JP | 2007-131075 A | 5/2007 |
| JP | 2007-131076 A | 5/2007 |

* cited by examiner

ELECTRIC POWER STEERING APPARATUS AND METHOD FOR CONTROLLING THE ELECTRIC POWER STEERING APPARATUS

FIELD OF THE INVENTION

The invention relates to an electric power steering apparatus and a method for controlling the electric power steering apparatus which is provided with an electric motor and which assists a turning operation of a driver's steering wheel performed by a driver.

BACKGROUND OF THE INVENTION

An electric power steering apparatus for a vehicle that detects a steering torque applied to a steering wheel which is turned by a driver (hereinafter, referred to as a "driver's steering wheel") and that causes an electric motor to produce an assist torque based on the detected steering torque has been used. An in-vehicle battery is used as an electric power supply unit for the electric power steering apparatus. There is also an electric power steering apparatus that is provided with a plurality of batteries in order to allow the electric power steering apparatus to function properly even if a malfunction occurs in one of the batteries. For example, Japanese Patent Application Publication No. JP-2000-236626 (JP-A-2000-236626) describes an electric power steering apparatus that is provided with a high-tension battery and a low-tension 12-V battery as electric power supply units used to drive an electric motor of the electric power steering apparatus. When electric power supply from the high-tension battery is shut off, electric power is supplied to the electric motor from the low-tension battery that serves as a back-up electric power supply unit.

However, when electric power is supplied to the electric motor from the low-tension battery, the electric motor does not rotate at a high speed. The required torque (assist torque) that needs to be produced by the electric motor is set based on the turning operation of the driver's steering wheel. As shown in FIG. 12, the motor speed $\omega 2$ at which the required torque is produced when the low-tension battery is used is considerably lower than the motor speed $\omega 1$ at which the required torque is produced when the high-tension battery is used. If a driver turns the driver's steering wheel gradually, no inconvenience is caused. However, if the driver turns the driver's steering wheel quickly, the motor speed does not respond accurately to the speed at which the driver turns the driver's steering wheel, which imposes resistance to the turning operation of the driver's steering wheel. The electric motor is connected to a steering mechanism that steers steering wheels of the vehicle. Accordingly, when the electric motor is not allowed to rotate at a high speed due to the usage of the low-tension battery, if the driver's steering wheel is turned quickly, the steering wheels are steered only by the steering force applied to the driver's steering wheel by the driver. Namely, the electric power steering apparatus does not appropriately assist the turning operation of the driver's steering wheel.

Such an inconvenience is minimized, for example, by providing a voltage-increasing circuit on the output side of the low-tension battery. However, provision of such voltage-increasing circuit causes other inconveniences such as a cost increase and necessity to create space for the voltage-increasing circuit.

SUMMARY OF THE INVENTION

The invention provides an electric power steering apparatus that appropriately assists the steering operation without an increase in cost and necessity to create extra space, even when a low-tension electric power supply unit, which serves as a backup electric power supply unit, is used to supply electric power. The invention also provides a method for controlling such electric power steering apparatus.

A first aspect of the invention relates to an electric power steering apparatus. The electric power steering apparatus includes a steering mechanism that steers steering wheels in response to a steering operation of a driver's steering wheel; an electric motor that is fitted to the steering mechanism and that rotates using electric power supplied from an electric power supply device to generate a force used to assist the steering operation; and a motor control unit that controls the operation of the electric motor based on the manner in which the steering operation of the driver's steering wheel is performed. The electric power supply device includes at least two electric power supply units connected in parallel, which are a main electric power supply unit and a sub-electric power supply unit that outputs a voltage lower than a voltage output from the main electric power supply unit. The electric power supply device is structured such that electric power is supplied to the electric motor from one of the main electric power supply unit and the sub-electric power supply unit. The motor control unit includes a vector control unit that controls rotation of the electric motor by executing vector control indicated by a two-phase rotating flux coordinate system where the direction in which the electric motor rotates is used as the q-axis and the direction perpendicular to the direction in which the electric motor rotates is used as the d-axis; and a motor speed compensation unit. When electric power is supplied to the electric motor from the sub-electric power supply unit, the motor speed compensation unit increases a d-axis current used as a field-weakening control current by a larger amount than when electric power is supplied to the electric motor from the main electric power supply unit so that a decrease in a motor speed due to a decrease in a voltage output from the electric power supply device is suppressed.

With the thus structured electric power steering apparatus, electric power is usually supplied to the electric motor from the main electric power supply unit. When a predetermined amount of electric power cannot be supplied to the electric motor due, for example, to a malfunction caused in the main electric power supply unit, electric power is supplied to the electric motor from the sub-electric power supply unit instead of from the main electric power supply unit. The motor control unit includes the vector control unit and the motor speed compensation unit, and controls rotation of the electric motor using the vector control unit by executing the vector control indicated by the two-phase rotating flux coordinate system (d-q coordinate system). When electric power is supplied to the electric motor from the sub-electric power supply unit, the motor speed compensation unit increases the d-axis current used as the field-weakening control current by a larger amount than when electric power is supplied to the electric motor from the main electric power supply unit.

The d-axis current is applied in the direction in which the motor torque is produced and in the direction in which the magnetic field of the permanent magnets of the electric motor is weakened, and suppresses a counter-electromotive force generated by rotation of the electric motor. Accordingly, when electric power is supplied from the sub-electric power supply unit, the electric motor is controlled such that a priority is given to the motor speed, unlike the case where electric power is supplied from the main electric power supply unit. As a result, it is possible to suppress a decrease in the motor speed even when the sub-electric power supply unit that outputs a voltage that is lower than a voltage output from the main electric power supply unit is used to supply electric power.

In the first aspect of the invention, a sub-electric power output line of the sub-electric power supply unit may be provided with a switching unit that permits or shuts off electric power supply through the sub-electric power output line, and a protection circuit that is provided between the switching unit and the sub-electric power supply unit and that prevents an increase in a voltage of the sub-electric power output line.

With the electric power steering apparatus having the structure described above, when the sub-electric power supply unit is not used, the switching unit is kept off, whereby an electric current is prevented from flowing from the main electric power supply unit to the sub-electric power supply unit. When the switching unit is on and electric power is supplied from the sub-electric power supply unit to the electric motor, even if regenerative electric power is generated by the electric motor, the regenerative electric power is absorbed by the protection circuit. As a result, it is possible to protect the sub-electric power supply unit and other electric loads that are supplied with electric power from the sub-electric power supply unit.

The main electric power supply unit may include a high-tension battery having a first voltage and a voltage-decreasing circuit that decreases the first voltage output from the high-tension battery, and output a voltage obtained by decreasing the first voltage. The sub-electric power supply unit may include a low-tension battery having a second voltage that is lower than the voltage that is obtained by decreasing the first voltage output from the main electric power supply unit, and output the second voltage. Electric power may be supplied to the electric motor from one of the main electric power supply unit and the sub-electric power supply unit.

With the electric power steering apparatus having the structure described above, when electric power is supplied from the high-tension battery of the main electric power supply unit, and the voltage output from the high-tension battery (the first voltage) is decreased, by the voltage-decreasing circuit, to a voltage at which the electric motor is driven appropriately, and the decreased voltage is output. Accordingly, a high-tension battery that is used, for example, as an electric power supply unit for a main motor (a motor for propelling a vehicle) of a hybrid vehicle is used as the electric power supply unit of the electric power steering apparatus. In addition, electric power is supplied after the voltage is decreased by the voltage-decreasing circuit to a voltage at which the electric motor is driven in the optimum manner. Therefore, it is possible to implement the higher-powered and higher-performance electric power steering apparatus.

Meanwhile, because the sub-electric power supply unit includes the low-tension battery having the second voltage that is lower than the voltage output from the main electric power supply unit, for example, a battery used for a common 12-V electric load is used as the sub-electric power supply unit. Electric power is supplied to the electric motor from one of the main electric power supply unit and the sub-electric power supply unit. When electric power is supplied from the main electric power supply unit, the d-axis current used as the field-weakening control current is increased by a larger amount than when electric power is supplied from the main electric power supply unit. Accordingly, an electric current is passed to the coils in the direction in which the magnetic field of the permanent magnets of the electric motor is weakened. Therefore, even when electric power is supplied from the low-tension electric power supply unit, a decrease in the motor speed is suppressed.

The electric power steering apparatus according to the first aspect of the invention may include an electric power supply unit change-over control unit that starts the operation of the voltage-decreasing circuit of the main electric power supply unit and turns off the switching unit of the sub-electric power supply unit when electric power is supplied to the electric motor from the main electric power supply unit, and that stops the operation of the voltage-decreasing circuit of the main electric power supply unit and turns on the switching unit of the sub-electric power supply unit when electric power is supplied to the electric motor from the sub-electric power supply unit.

With the electric power steering apparatus having the structure described above, because the electric power supply change-over control unit turns off the switching unit of the sub-electric power supply unit when electric power is supplied to the electric motor from the main electric power supply unit, it is possible to prevent an electric current from flowing from the main electric power supply unit to the sub-electric power supply unit. When electric power is supplied to the electric motor from the sub-electric power supply unit, the operation of the voltage-decreasing circuit of the main electric power supply unit is stopped, electric power supply from the main electric power supply unit is shut off, and the switching unit is turned on, whereby an electric power supply circuit extending from the sub-electric power supply unit is formed. In this case, because the operation of the voltage-decreasing circuit is stopped, an electric current does not flow from the main electric power supply unit to the sub-electric power supply unit. Also, even when regenerative electric power is generated by the electric motor, the regenerative electric power is absorbed by the protection circuit provided on the electric power supply line of the sub-electric power supply unit. Accordingly, it is possible to protect the low-tension battery and other electric loads that are supplied with electric power from the low-tension battery.

The electric power steering apparatus according to the first aspect of the invention may further include a supply voltage detection unit that detects a voltage output from the electric power supply device. The motor speed compensation unit may control the supply amount of d-axis current used as the field-weakening control current based on the voltage detected by the supply voltage detection unit.

With the electric power steering apparatus having the structure described above, the voltage output from the electric power supply device is detected by the supply voltage detection unit, and the supply amount of the d-axis current is controlled by the motor speed compensation unit based on the detected output voltage. Accordingly, when electric power is supplied to the electric motor from the sub-electric power supply unit that outputs a low voltage, the amount of d-axis current is automatically increased. Accordingly, it is not necessary to change the field-weakening control depending on, for example, the electric power supply unit used to supply electric power to the electric motor, which facilitates execution of the control.

The electric power steering apparatus according the first aspect of the invention may further include a magnetic force decrease prevention unit that sets the upper limit value for the d-axis current to prevent a decrease in a magnetic force of a permanent magnet of the electric motor.

If an excess d-axis electric current is applied, the magnetic force of the permanent magnet of the electric motor is decreased. According to the first aspect of the invention, such an inconvenience is prevented by setting the upper limit value for the d-axis current.

A second aspect of the invention relates to a method for controlling an electric power steering apparatus including a steering mechanism that steers steering wheels in response to a steering operation of a driver's steering wheel; an electric motor that is fitted to the steering mechanism and that rotates using electric power supplied from an electric power supply device to generate a force used to assist the steering operation; and a motor control unit that controls the operation of the electric motor based on the manner in which the steering operation of the driver's steering wheel is performed. The method includes a step in which electric power is supplied to the electric motor from one of at least two electric power supply units which are included in the electric power supply device, which are connected in parallel, and which include a main electric power supply unit and a sub-electric power supply unit that outputs a voltage lower than a voltage output from the main electric power supply unit; a step in which the motor control unit controls rotation of the electric motor by executing vector control indicated by a two-phase rotating flux coordinate system where the direction in which the electric motor rotates is used as the q-axis and the direction perpendicular to the direction in which the electric motor rotates is used as the d-axis; and a step in which, when electric power is supplied to the electric motor from the sub-electric power supply unit, the motor control unit increases a d-axis current used as a field-weakening control current by a larger amount than when electric power is supplied to the electric motor from the main electric power supply unit so that a decrease in a motor speed due to a decrease in a voltage output from the electric power supply device is suppressed.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EXAMPLE EMBODIMENT

Figure 1:
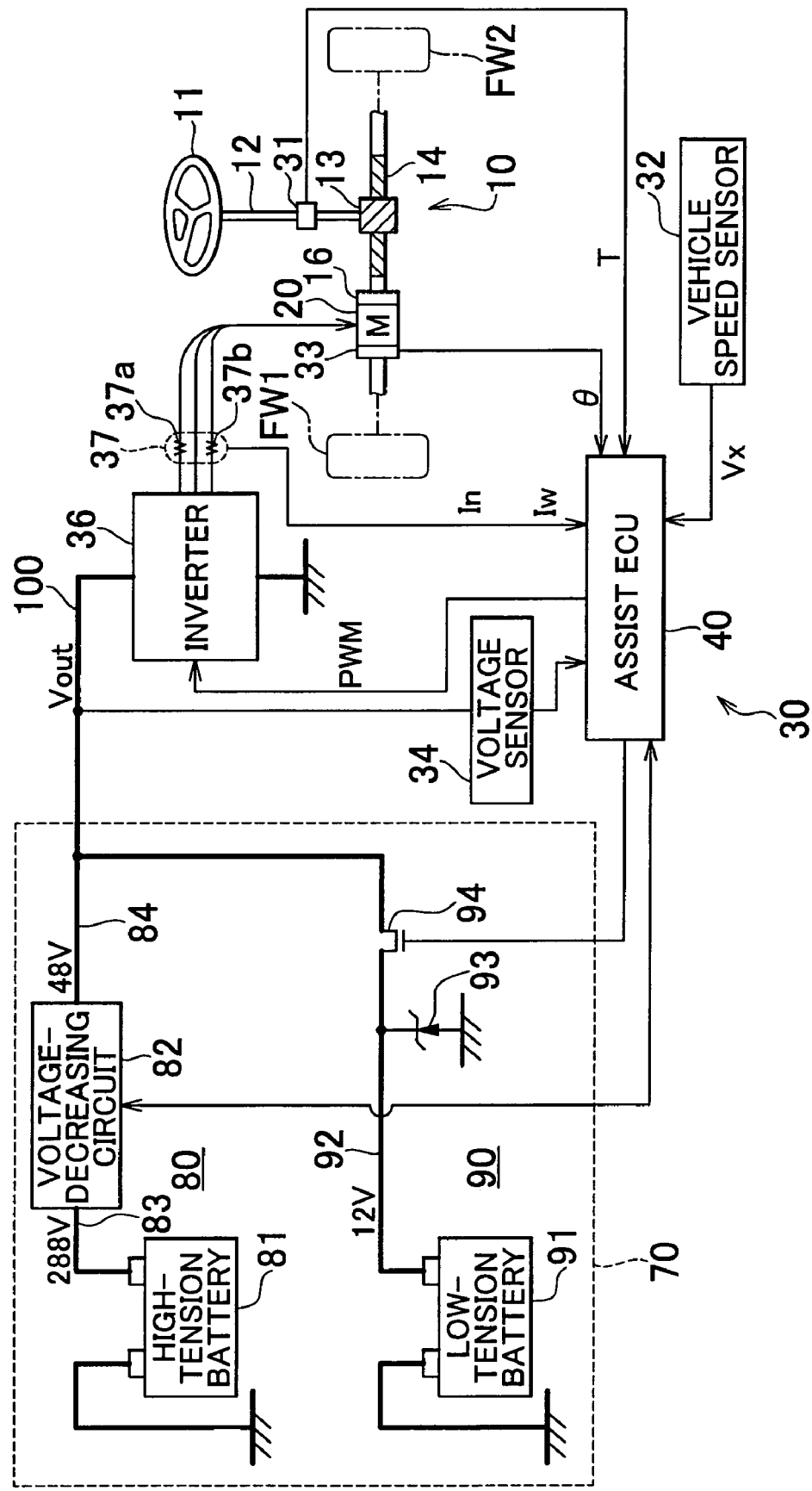
FIG. 1 is the view schematically showing the entire structure of an electric power steering apparatus according to an embodiment of the invention.

Hereafter, an electric power steering apparatus according to an embodiment of the invention will be described with reference to the accompanying drawings. FIG. 1 is the view schematically showing the electric power steering apparatus according to the embodiment of the invention.

The electric power steering apparatus mainly includes a steering mechanism 10 that steers steering wheels of a vehicle in response to the turning operation of a driver's steering wheel 11; an electric motor 20 that is fitted to the steering mechanism 10 and that generates a force used to assist the turning operation of the driver's steering wheel (hereinafter, referred to as a "steering operation assist force"); a motor control unit 30 that controls the operation of the electric motor 20 in response to the turning operation of the driver's steering wheel ii; and an electric power supply device 70 that supplies electric power to the electric motor 20 and the motor control unit 30.

The steering mechanism 10 includes a steering shaft 12 that is connected, at its upper end, to the driver's steering wheel 11 so as to turn together with the driver's steering wheel 11. A pinion gear 13 is connected to the lower end of the steering shaft 12 so as to turn together with the steering shaft 12. The pinion gear 13 meshes with rack teeth formed in a rack bar 14, whereby a rack-and-pinion gear mechanism is formed. A left front wheel FW1 and a right front wheel FW2 are connected to the respective ends of the rack bar 14 via tie rods (not shown) and knuckle arms (not shown) so that the front wheels FW1 and 2 can be steered. The left front wheel FW1 and the right front wheel FW2 are steered in the clockwise direction or in the counterclockwise direction in accordance with the movement of the rack bar 14 in its axial direction, which is caused due to the turning of the steering shaft 12 around the axis of the steering shaft 12.

The electric motor 20 used to assist the turning operation of the driver's steering wheel 11 is fitted to the rack bar 14. The electric motor 20 is formed of a three-phase synchronous permanent magnet motor (a brushless motor). The electric motor 20 includes a stator fitted within a housing. In the electric motor 20, a three-phase electric current (armature current) is passed through coils wound around the stator, whereby a three-phase rotating magnetic field is produced. A rotor, to which permanent magnets are fixed, rotates within the three-phase rotating magnetic field based on the magnitude of the three-phase electric current.

The rotating shaft of the electric motor 20 is connected to the rack bar 14 via a ball screw mechanism 16 so that power is transferred from the electric motor 20 to the rack bar 14. The rotation of the rotating shaft of the electric motor 20 assists the steering operation of the left front wheel FW1 and the right front wheel FW2. The ball screw mechanism 16 serves as a speed reducer and a turning-linear movement converter. The ball screw mechanism 16 reduces the speed of rotation transferred from the electric motor 20, converts the rotational movement of the electric motor 20 to the linear movement, and transfers the linear movement to the rack bar 14. Instead of being fitted to the rack bar 14, the electric motor 20 may be fitted to the steering shaft 12. Then, the rotation of the electric motor 20 may be transferred to the steering shaft 12 via a speed reducer to drive the steering shaft 12 so that the steering shaft 12 is caused to turn around its axis.

Next, the motor control unit 30 that controls the operation of the electric motor 20 will be described. The motor control unit 30 includes an electronic control unit 40 that is formed mainly of a microcomputer including a CPU, ROM, RAM, etc. and that calculates the steering operation assist amount (hereinafter, referred to as an "assist ECU 40"), an inverter 36 that is a drive circuit for the electric motor 20, a steering torque sensor 31 that is a sensor used to control an electric current passed to the electric motor 20, a vehicle speed sensor 32, a rotational angle sensor 33, a voltage sensor 34, and a current sensor 37.

The steering torque sensor 31 is fitted to the steering shaft 12, and detects the steering torque T that is applied to the steering shaft 12 in response to the turning operation of the driver's steering wheel 11. The steering torque T is indicated by a positive value or a negative value. When being a positive value, the steering torque T indicates the magnitude of the steering torque produced by the clockwise turning operation of the driver's steering wheel 11. When being a negative value, the steering torque T indicates the magnitude of the steering torque produced by the counterclockwise turning operation of the driver's steering wheel 11. Instead of being fitted to the steering shaft 12, the steering torque sensor 31 may be fitted to the rack bar 14 to detect the steering torque T based on the amount by which the rack bar 14 is moved in its axial direction. The vehicle speed sensor 32 detects the vehicle speed Vx, and outputs a signal indicating the detected vehicle speed Vx.

The rotational angle sensor 33 is formed of an encoder incorporated within the electric motor 20. As the rotor of the electric motor 20 rotates, the rotational angle sensor 33 outputs two-phase pulse train signals that are different in phase by $\pi/2$ and a zero-phase pulse train signal indicating the reference rotational position. The detection signals from the rotational angle sensor 33 are used to calculate the rotational angle $\theta$ and the angular speed $\omega$ of the electric motor 20. The rotational angle $\theta$ of the electric motor 20 is proportional to the steering angle of the driver's steering wheel 11. Accordingly, the rotational angle $\theta$ is used also as the steering angle of the driver's steering wheel 11 in this specification.

The angular speed $\omega$, which is the motor speed of the electric motor 20, is proportional to the steering angular speed of the driver's steering wheel 11. Accordingly, the angular speed $\omega$ is used also as the steering angular speed of the driver's steering wheel 11 in this specification. Instead of using the detection signals output from the rotational angle sensor 33, a sensor that detects the rotational angle of the steering shaft 12 or the position of the rack bar 14 in its axial direction may be prepared, the rotational angle of the steering shaft 12 or the movement amount of the rack bar 14 may be used as the steering angle of the driver's steering wheel 11, and the derivative value of the rotational angle or the derivative value of the movement amount may be used as the steering angular speed of the driver's steering wheel 11. The thus detected steering angle $\theta$ and steering angular speed $\omega$ are each indicated by a positive value or a negative value. When being positive values, the steering angle $\theta$ and the steering angular speed $\omega$ indicate the steering angle and the steering angular speed when the driver's steering wheel 11 is turned in the clockwise direction, respectively. When being negative values, the steering angle $\theta$ and the steering angular speed $\omega$ indicate the steering angle and the steering angular speed when the driver's steering wheel 11 is turned in the counterclockwise direction, respectively.

As the inverter 36, for example, a three-phase voltage PWM (pulse-width modulation) inverter is used. The inverter 36 is provided on an electric power supply line 100 through which electric power is supplied from the electric power supply device 70 to the electric motor 20. The inverter 36 turns on/off switching elements of a three-phase bridge circuit (not shown) in response to PWM control signals from the assist ECU 40, thereby passing a predetermined magnitude of three-phase electric current to the coils of the electric motor 20. The current sensor 37 detects the electric current passed from the inverter 36 to the electric motor 20. The current sensor 37 includes current sensors 37a and 37b that detect the electric currents passed to the two-phases (for example, the U-phase and the W-phase) among the three-phases. The voltage sensor 34 translates the voltage output from the electric power supply line 100, through which electric power is supplied from the electric power supply device 70 to the inverter 36, into a digital signal using an A/D (analog-digital) converter, and outputs the digital signal, which indicates the voltage Vout output from the electric power supply device 70 (hereinafter, sometimes referred to as the "output voltage Vout"), to the assist ECU 40.

The assist ECU 40 receives the detection signals from the steering torque sensor 31, the vehicle speed sensor 32, the rotational angle sensor 33, the voltage sensor 34, and the current sensor 37 (the current sensors 37a and 37b), and calculates the control current value for the electric motor 20, described later in detail, based on the values indicated by these detection signals.

The electric power supply device 70 includes a main electric power supply unit 80 that serves as a main power supply unit used to drive the electric motor 20 of the electric power steering apparatus, and a sub-electric power supply unit 90 that serves as a back-up electric power supply unit for the electric power steering apparatus, which is used when a malfunction occurs in the main electric power supply unit 80. The main electric power supply unit 80 is formed of a high-tension battery 81 and a voltage-decreasing circuit 82. As the high-tension battery 81, a battery having a rated voltage of 288 V is used in the embodiment of the invention. The electric power steering apparatus according to the embodiment of the invention is mounted in a hybrid vehicle. The hybrid vehicle is provided with a high-tension battery that drives a motor used to propel the vehicle (a main motor). Accordingly, the high-tension battery is used also to drive the motor of the electric power steering apparatus. Preferably, the electric motor is driven at a high voltage in order to meet the demand for a higher-powered and higher-performance electric power steering apparatus. Therefore, in the electric power steering apparatus according to the embodiment of the invention, the high-tension battery, which is used as the electric power supply unit for the motor for propelling the vehicle, is used as the main electric power supply unit.

The voltage-decreasing circuit 82 is provided on an output line 83 of the high-tension battery 81, and decreases the battery voltage (288 V) to 48 V at which the electric motor 20 of the electric power steering apparatus is driven in the optimum manner. Because the voltage-decreasing circuit 82 has a common structure, description of the voltage-decreasing circuit 82 with reference to a drawing will not be provided below. The voltage-decreasing circuit 82 includes an electric circuit that converts a direct-current voltage output from the high-tension battery 81 into an alternating-current voltage using a transistor bridge circuit, decreases the alternating-current voltage to a low voltage using a transformer, rectifies and smoothes the lowered alternating-current voltage, and then converts the alternating-current voltage to a direct-current voltage; and a voltage-decreasing control circuit that controls a transistor bridge so that the decreased voltage becomes equal to the target voltage (48 V).

An absorption circuit (not shown) that absorbs regenerative electric power generated by the electric motor 20 is provided within the voltage-decreasing circuit 82, on its output side. In the absorption circuit, for example, an output line 84 of the voltage-decreasing circuit 82 is grounded using a series circuit including a switching element and a resistance. When the voltage of the output line 84 increases due to the regenerative electric power generated by the electric motor 20, the switching element is turned on/off at a duty ratio corresponding to the increased voltage, whereby the regenerative electric power is absorbed.

The sub-electric power supply unit 90 includes a low-tension battery 91, a protection circuit 93 that is provided on an output line 92 (corresponding to a sub-power supply output line according to the invention) of the low-tension battery 91, and a change-over switch 94. The low-tension battery 91 is a general-purpose battery having a rated voltage of 12 V, which supplies electric power to various electric loads arranged within the vehicle, and is used also as an electric power supply unit for controlling the motor control unit 30. The change-over switch 94 is regarded as a switching unit according to the invention. As the change-over switch 94, for example, a MOSFET (metal-oxide semiconductor field-effect transistor) is used. The change-over switch 94 is turned on/off in response to a signal from the assist ECU 40. The change-over switch 94 is on (the circuit is closed) when electric power is supplied to the electric motor 20 from the sub-electric power supply unit 90. The change-over switch 94 is off (the circuit is open) when electric power is supplied to the electric motor 20 from the main electric power supply unit 80.

As the protection circuit 93, a zener diode is used. In the embodiment of the invention, a zener diode having a zener voltage of 27 V is used. Accordingly, even if the voltage of the output line 92 of the sub-electric power supply unit 90 increases due to the regenerative electric power generated by the electric motor 20, the regenerative electric power is absorbed at a safe level of voltage (27 V). It is, therefore, possible to protect various electric loads that are supplied with electric power from the low-tension battery 91. The output line 84 of the main electric power supply unit 80 and the output line 92 of the sub-electric power supply unit 90 are connected to each other by the electric power supply line 100. Accordingly, the electric power supply device 70 is structured such that the main electric power supply unit 80 and the sub-electric power supply unit 90 are connected to each other in parallel and electric power from one of these electric power supply units 80 and 90 is output through the electric power supply line 100.

Next, the outline of the operation of the electric power steering apparatus will be described. The turning operation of the driver's steering wheel 11 performed by a driver is transferred to the rack bar 14 via the steering shaft 12 and the pinion gear 13 and moves the rack bar 14 in its axial direction, whereby the left front wheel FW1 and the right front wheel FW2 are steered. At the same time, the assist ECU 40 detects the steering torque T applied to the steering shaft 12 based on a signal from the steering torque sensor 31, detects the vehicle speed Vx based on a signal from the vehicle speed sensor 32, and calculates the assist torque based on the detected steering torque T and vehicle speed Vx. The assist ECU 40 controls the electric motor 20 by passing an appropriate amount of the electric power corresponding to the calculated assist torque, thereby driving the rack bar 14. As a result, a steering operation assist force is generated.

Figure 2:
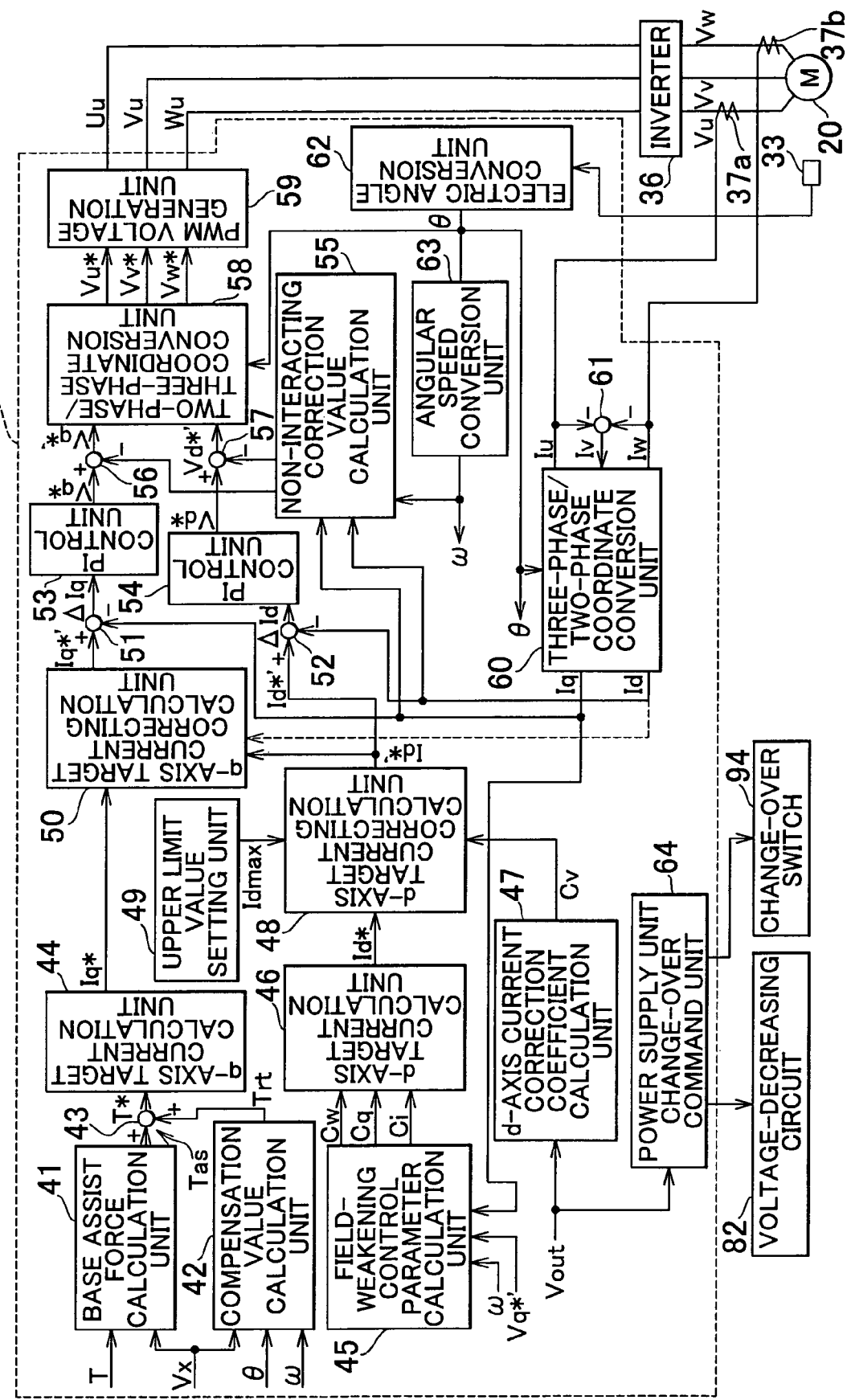
FIG. 2 is the functional block diagram showing the functions of an assist ECU.

Next, the assist ECU 40 will be described. The assist ECU 40 receives signals from the steering torque sensor 31, the vehicle speed sensor 32, the rotational angle sensor 33, the voltage sensor 34, and the current sensors 37a and 37b. The assist ECU 40 calculates the control amount of the electric motor 20, and selects the electric power supply unit used in the electric power supply device 70. FIG. 2 is the functional block diagram showing the functions of the microcomputer of the assist ECU 40, which are realized by executing the programs.

The assist ECU 40 controls the rotation of the electric motor 20 by executing the vector control that is indicated by a two-phase rotating flux coordinate system where the direction in which the electric motor 20 rotates is used as the q-axis and the direction that is perpendicular to the direction in which the electric motor 20 rotates is used as the d-axis. In other words, the d-axis indicates the direction in which the magnetic field formed by the permanent magnets extends, and the q-axis indicates the direction that is perpendicular to the direction in which the magnetic field extends.

The assist ECU 40 includes a base assist force calculation unit 41 and a compensation value calculation unit 42. The base assist force calculation unit 41 has a base assist force table that stores the base assist force Tas which changes, as shown in the graph in FIG. 3, based on the steering torque T and the vehicle speed Vx. The base assist force calculation unit 41 receives a signal indicating the steering torque T from the steering torque sensor 31 and a signal indicating the vehicle speed Vx from the vehicle speed sensor 32, and calculates the base assist force Tas using the base assist force table. In this case, the base assist force Tas increases with an increase in the steering torque T and decreases with an increase in the vehicle speed Vx.

Figure 3:
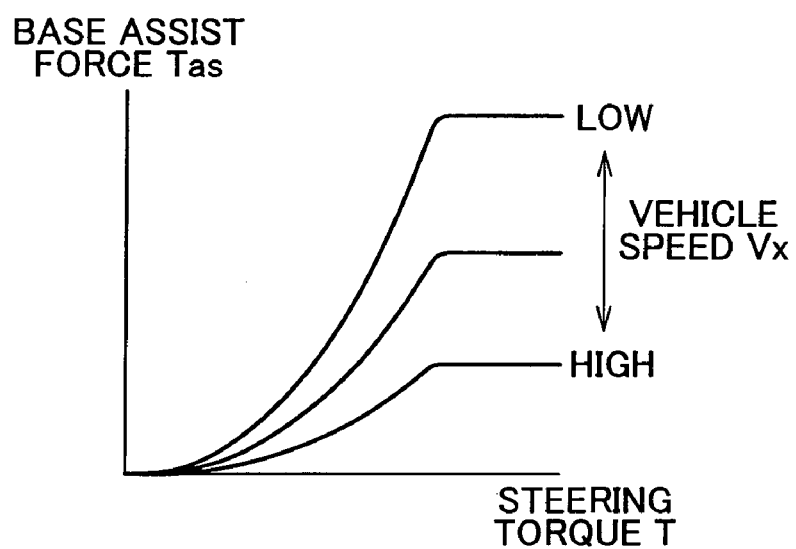
FIG. 3 is the graph showing the relationship between steering torque and the base assist force.

The graph in FIG. 3 shows only the relationship between the base assist force Tas and the steering torque T indicated by a positive value, namely, the steering torque T applied when the driver's steering wheel 11 is turned in the clockwise direction. The lines, which indicate the relationship between the base assist force Tas and the steering torque T indicated by a negative value, namely, the steering torque T applied when the driver's steering wheel 11 is turned in the counterclockwise direction, are symmetric with the lines, which indicate the relationship between the base assist force Tas and the steering torque T indicated by a positive value, with respect to the origin point of the graph in FIG. 3. In the embodiment of the invention, the base assist force Tas is calculated using the base assist force table. Instead of calculating the base assist force Tas using the base assist force table, a function that defines the base assist force Tas which changes based on the steering torque T and the vehicle speed V may be prepared and the base assist force Tas may be calculated using the function.

The compensation value calculation unit 42 receives a signal indicating the vehicle speed Vx, a signal indicating the rotational angle θ of the electric motor 20 (corresponding to the steering angle θ of the driver's steering wheel 11) and a signal indicating the angular speed ω of the electric motor 20 (corresponding to the steering angular speed ω of the driver's steering wheel 11), and calculates the compensation value Trt corresponding to the base assist force Tas. Namely, the compensation value calculation unit 42 calculates the compensation value Trt basically by adding the force of the steering shaft 12 to return to the reference position, which increases in proportion to the steering angle θ, to the returning torque corresponding to the resistance force against the turning of the steering shaft 12, which increases in proportion to the steering angular speed ω. The compensation value Trt increases with an increase in the vehicle speed Vx. The compensation value Trt may be calculated based on the values indicated by the signals from the other sensors in addition to the values described above.

Signals indicating the base assist force Tas and the compensation value Trt are transmitted to a calculation unit 43. The calculation unit 43 adds the base assist force Tas to the compensation value Trt, and transmits a signal indicating the target command torque T*, which is the result of addition, to a q-axis target current calculation unit 44. The q-axis target current calculation unit 44 calculates the q-axis target current Iq* that is proportional to the target command torque T*. The q-axis target current Iq* is the q-axis component current in the vector control indicated by the two-phase rotating flux coordination system, and used to control the magnitude of the rotating torque generated by the electric motor 20.

The assist ECU 40 includes a field-weakening control parameter calculation unit 45 related to the field-weakening control for implementing the more compact, higher-powered and higher-performance electric motor 20. The field-weakening control parameter calculation unit 45 receives signals indicating the angular speed ω of the electric motor 20, the q-axis command voltage Vq*' for the electric motor 20, and the q-axis actual current Iq of the electric motor 20, and calculates the first parameter Cw, the second parameter Cq and the third parameter Ci corresponding to the angular speed (o, the q-axis command voltage Vq*', and the q-axis actual current Iq using the first, second, and third parameter tables, respectively. Signals indicating the first to third parameters Cw, Cq and Ci are transmitted to a d-axis target current calculation unit 46. The d-axis target current calculation unit 46 multiples the first to third parameters Cw, Cq and Ci by the positive coefficient k to calculate the d-axis target current Id* (=k×Cw×Cq×Ci). The d-axis target current Id* is the d-axis component current in the vector control indicated by the two-phase rotating flux coordination system, and used to weaken the magnetic field of the electric motor 20.

Figure 4:
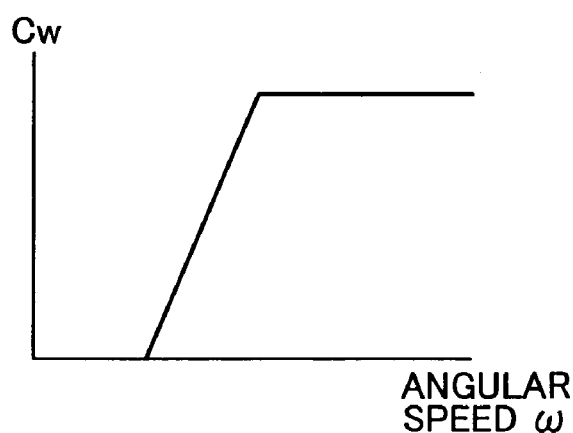
FIG. 4 is the graph showing the relationship between the angular speed of an electric motor and the first parameter Cw among the field-weakening control parameters.

Next, the first to third parameters Cw, Cq and Ci will be described. As shown in the graph in FIG. 4, the first parameter table stores the first parameter Cw that is 0 when the angular speed ω of the electric motor 20 is low, and that is a substantially constant positive value when the angular speed ω is high. In other words, the first parameter table stores the first parameter Cw that increases until the angular speed ω reaches a predetermined value. Accordingly, the first parameter Cw set based on this characteristic signifies that the field-weakening current is increased when the motor speed of the electric motor 20 is high, and changes the characteristic of the electric motor 20 so that a higher priority is given to the motor speed rather than the output torque. Also, the first parameter is set so that an unnecessary field-weakening current is prevented from flowing when the motor speed of the electric motor 20 is low, namely, when the driver's steering wheel is turned gradually.

Figure 5:
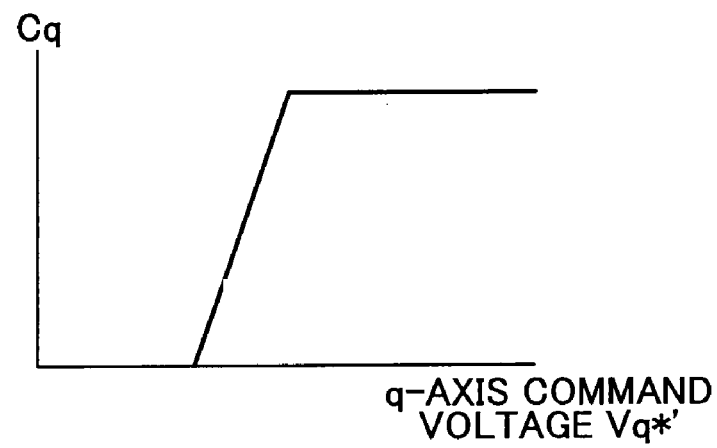
FIG. 5 is the graph showing the relationship between the q-axis command voltage of the electric motor and the second parameter Cq among the field-weakening control parameters.

As shown in the graph in FIG. 5, the second parameter table stores the second parameter Cq is 0 when the q-axis command voltage Vq*' of the electric motor 20 is low and is a substantially constant positive value when the q-axis command voltage Vq*' is high. In other words, the second parameter tables stores the second parameter Cq that increases until the q-axis command voltage Vq*' reaches a predetermined value. A high q-axis command voltage Vq*' signifies that the q-axis command current ΔIq is great, namely, the deviation of the actual q-axis current Iq of the electric motor 20 from the q-axis target electric current Iq*' (the corrected q-axis target current Iq*') is great. As the deviation increases, the field-weakening current of the electric motor 20 increases. The second parameter Cq is set so that, when the driver's steering wheel 11 is turned gradually and slightly while the vehicle is running, the motor speed of the electric motor 20 is increased by executing the field-weakening control if the deviation is great, and an unnecessary field-weakening current is prevented from flowing when the deviation is small.

Figure 6:
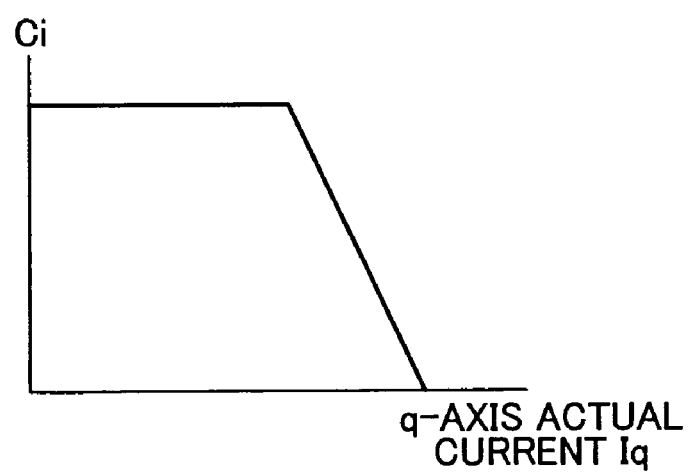
FIG. 6 is the graph showing the relationship between the q-axis actual current of the electric motor and the third parameter Ci among the field-weakening control parameters.

As shown in FIG. 6, the third parameter table stores the third parameter Ci that is a substantially constant positive value when the q-axis actual current Iq is small, and that is 0 when the q-axis actual current Iq is great. In other words, the third parameter table stores the third parameter Ci that decreases as the q-axis actual current Iq increases after reaching a predetermined value. The third parameter Ci is set so as to prevent the situation where a higher steering torque needs to be applied to the driver's steering wheel 11 due to a decrease in the steering operation assist force generated by the electric motor 20 if the driver's steering wheel 11 is turned more quickly when the angular speed ω of the electric motor 20 is high. In the embodiment of the invention, the first to third parameters Cw, Cq and Ci are calculated using the first to third parameter tables, respectively. Instead of using these parameter tables, the functions that define the first to third parameters Cw, Cq and Ci which change based on the angular speed ω, the q-axis command voltage Vq*' and the q-axis actual current Iq, respectively, may be prepared, and the first to third parameters Cw, Cq and Ci may be calculated using these functions.

The assist ECU 40 includes a d-axis current correction coefficient calculation unit 47 that calculates a correction coefficient used to correct the d-axis target current Id*, which is calculated by the d-axis target current calculation unit 46, based on the voltage Vout output from the electric power supply device 70. The d-axis current correction coefficient calculation unit 47 receives a detection signal indicating the voltage Vout output from the electric power supply device 70, which is transmitted from the voltage sensor 34, and calculates the correction coefficient Cv using the correction coefficient calculation table.

Figure 7:
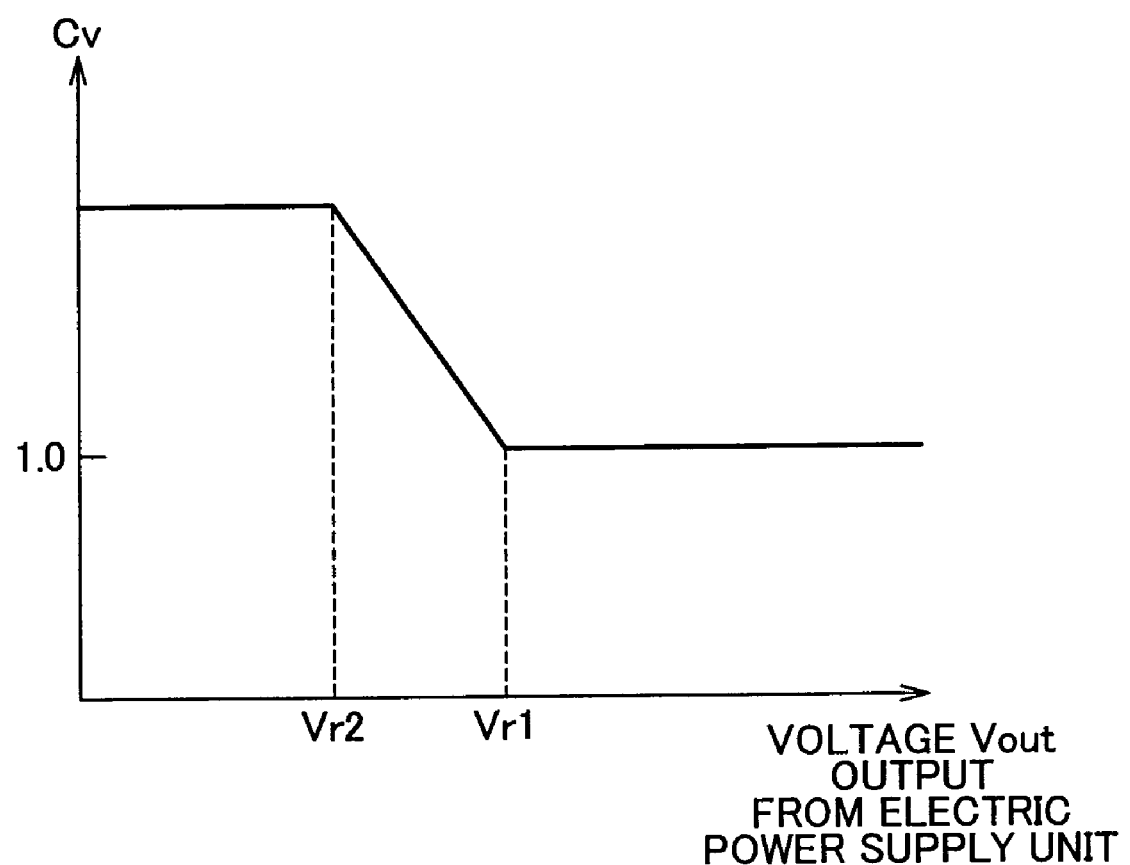
FIG. 7 is the graph showing the relationship between the voltage output from an electric power supply device and the correction coefficient Cv.

Based on the correction coefficient calculation table, when the output voltage Vout is equal to or higher than the reference voltage Vr1, the correction coefficient Cv is set to 1 (Cv=1), and when the output voltage Vout is lower than the reference voltage Vr1, the correction coefficient Cv is set to a value greater than 1, as shown in the graph in FIG. 7. In other words, the d-axis current correction coefficient calculation unit 47 stores the correction coefficient Cv that increases as the output voltage Vout decreases until the output voltage Vout reaches a predetermined value. In the example shown in FIG. 7, when the output voltage Vout is equal to or lower than the predetermined voltage Vr2 that is lower than the reference voltage Vr1, the correction coefficient Cv is set to a predetermined value (for example, Cv=2). The reference voltage Vr1 is set to, for example, 30 V. In the embodiment of the invention, the correction coefficient Cv is calculated using the correction coefficient table. Instead of using the correction coefficient table, the function that defines the correction coefficient Cv which changes based on the output voltage Vout may be prepared, and the correction coefficient Cv may be calculated using the function.

Signals indicating the d-axis target current Id* calculated by the d-axis target current calculation unit 46 and the correction coefficient Cv calculated by the d-axis current correction coefficient calculation unit 47 are transmitted to a d-axis target current correcting calculation unit 48. The d-axis target current correcting calculation unit 48 calculates the corrected d-axis target current Id*' by multiplying the d-axis target current Id* indicated by the received signal by the correction coefficient Cv (Id*'=Id*×Cv). Accordingly, when the voltage Vout output from the electric power supply device 70 is low, the magnetic field of the electric motor 20 is weakened by increasing the d-axis target current Id*.

The corrected d-axis target current Id*' calculated by the d-axis target current correcting calculation unit 48 is restricted so as to be equal to or lower than the upper limit value Idmax that is set in advance by an upper limit value setting unit 49. If excess d-axis current is passed to the electric motor 20, the magnetic force of the permanent magnets of the electric motor 20 decreases. To prevent such a decrease in the magnetic force, the upper limit value Idmax for the d-axis current is set.

Figure 8:
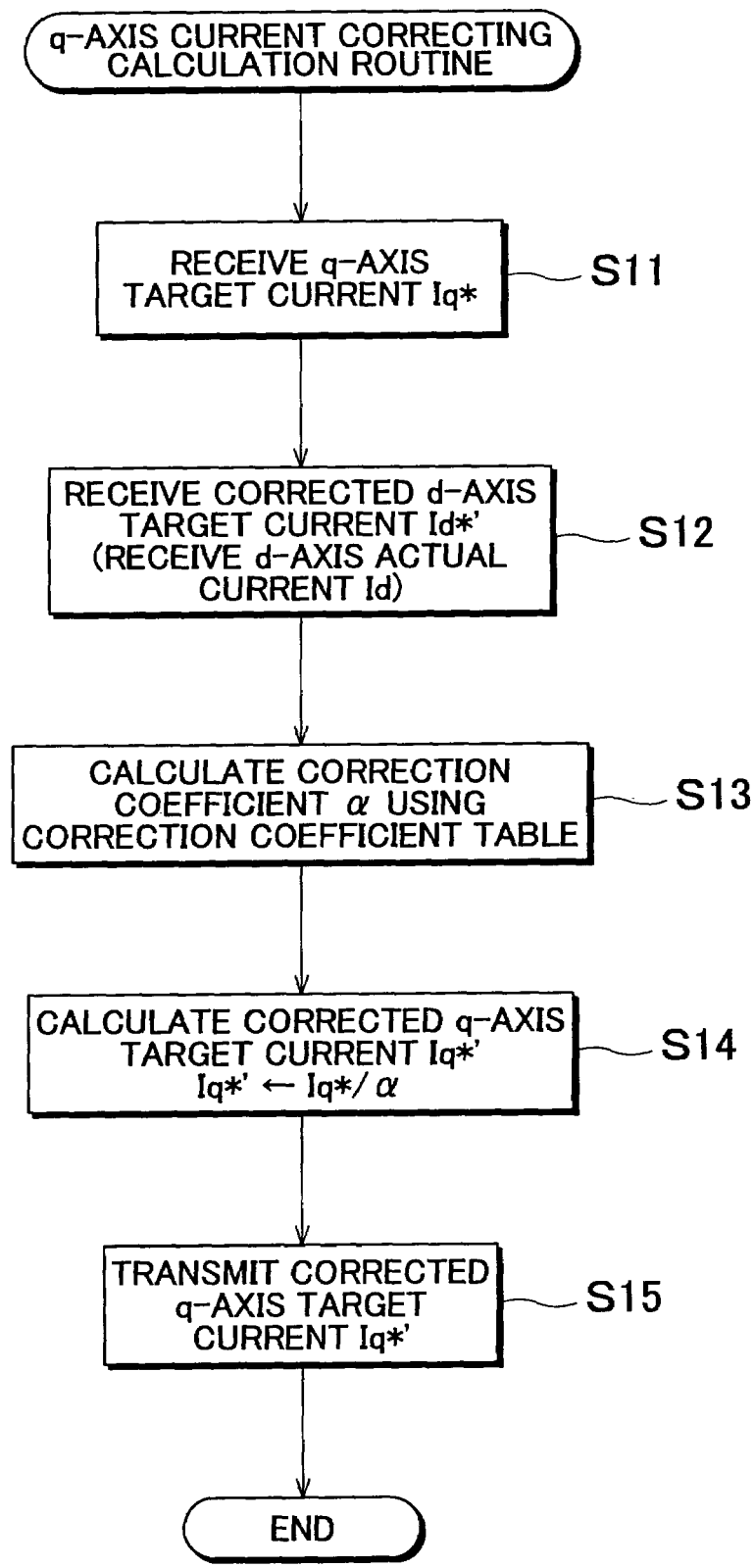
FIG. 8 is the flowchart showing the q-axis current correcting calculation routine.
Figure 9:
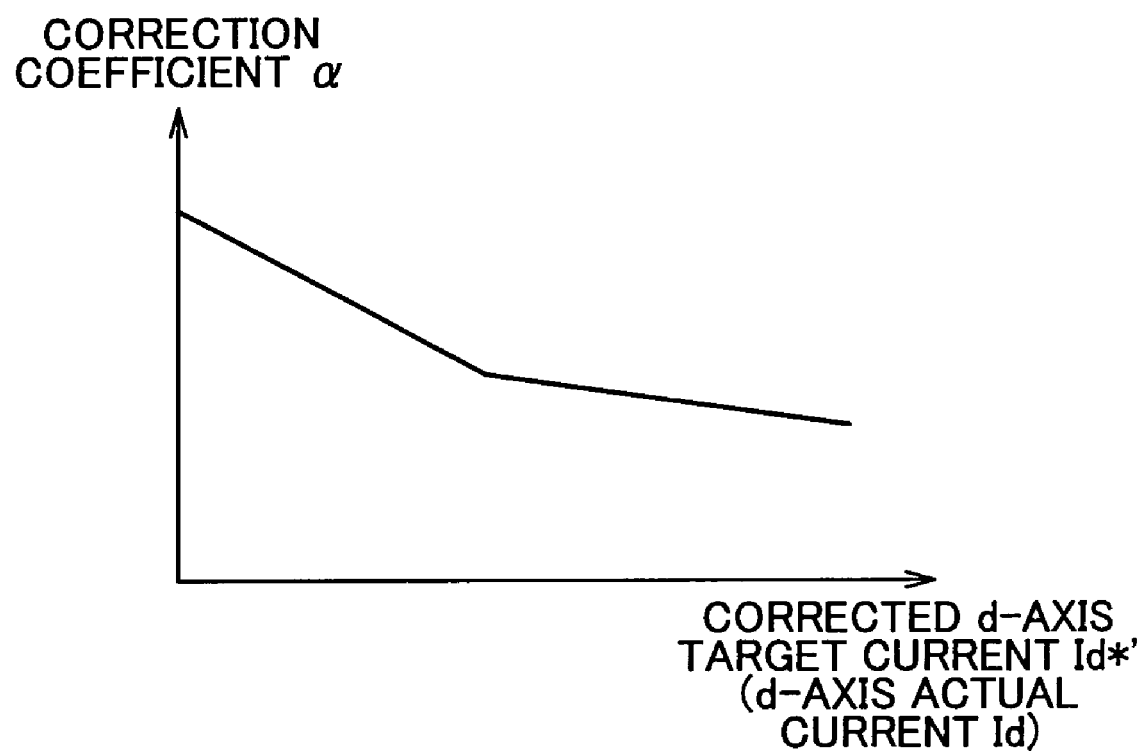
FIG. 9 is the graph showing the relationship between the corrected d-axis target current and the correction coefficient α.

Signals indicating the q-axis target current Iq* calculated by the q-axis target current calculation unit 44 and the corrected d-axis target current Id*' calculated by the d-axis target current correcting calculation unit 48 are transmitted to a q-axis target current correcting calculation unit 50. The q-axis target current correcting calculation unit 50 corrects the q-axis target current Iq* using the corrected d-axis target current Id*' by executing the q-axis current correcting calculation program in FIG. 8. The q-axis target current correcting calculation unit 50 receives the signal indicating the q-axis target current Iq* from the q-axis target current calculation unit 44 (S11), and the signal indicating the corrected d-axis target current Id*' from the d-axis target current correcting calculation unit 48 (S12). Then, the q-axis target current correcting calculation unit 50 calculates the correction coefficient $\alpha$ corresponding to the corrected d-axis target current Id*' using the correction coefficient table (S13). The correction coefficient table is stored in the q-axis target current correcting calculation unit 50. As shown in the graph in FIG. 9, the correction coefficient table stores the positive correction coefficient $\alpha$ that decreases as the corrected d-axis target current Id*' increases. In the embodiment of the invention, the correction coefficient $\alpha$ is calculated using the correction coefficient table. Instead of using the correction coefficient table, the function that defines the correction coefficient $\alpha$ which changes based on the corrected d-axis target current Id*' may be prepared, and the correction coefficient $\alpha$ may be calculated using the function.

Next, the q-axis target current correcting calculation unit 50 calculates the corrected q-axis target current Iq*' by making correction to the q-axis target current Iq*, that is, by dividing the q-axis target current Iq* by the correction coefficient $\alpha$ (S14), and transmits a signal indicating the corrected q-axis target current Iq*' to a calculation unit 51 (S15). Thus, as the corrected d-axis target current Id*' increases, the corrected q-axis target current Iq*' that is derived through correction of the q-axis target current Iq* increases.

The corrected d-axis target current Id*' is substantially equal to the d-axis actual current Id described later. Accordingly, the q-axis target current correcting calculation unit 50 may calculate the corrected q-axis target current Iq*' derived through correction of the q-axis target current Iq* using the d-axis actual current Id instead of using the corrected d-axis target current Id*', as shown by the dashed line in FIG. 2. In this case, as indicated in parentheses along the lateral axis in FIG. 9, the correction coefficient table stores the correction coefficient $\alpha$ that changes based on the d-axis actual current Id in the same manner in which the correction coefficient $\alpha$ changes based on the corrected d-axis target current Id*'. Then, as indicated in parentheses in step S12 in FIG. 8, the q-axis target current correcting calculation unit 50 receives a signal indicating the d-axis actual current Id, and calculates the correction coefficient $\alpha$ in step S13 using the changed correction coefficient table.

The calculation unit 51 subtracts the q-axis actual current Iq from the corrected q-axis target current Iq*', and transmits a signal indicating the result of subtraction, that is, the q-axis command current $\Delta$Iq to a proportional-integral control unit (PI control unit) 53. A calculation unit 52 subtracts the d-axis actual current Id from the corrected d-axis target current Id*', and transmits a signal indicating the result of subtraction, that is, the d-axis command current $\Delta$Id, to a proportional-integral control unit (PI control unit) 54. The proportional-integral control units 53 and 54 calculate, by executing the proportional-integral calculation, the q-axis command voltage Vq* and the d-axis command voltage Vd* so that the q-axis actual current Iq and the d-axis actual current Id become substantially equal to the q-axis command current Iq*' and the d-axis command current Id*', respectively.

The q-axis command voltage Vq* and the d-axis command voltage Vd* are corrected to the q-axis corrected command voltage Vq*' and the d-axis corrected command voltage Vd*' by a non-interacting correction value calculation unit 55, and a calculation unit 56 and a calculation unit 57, respectively. Then, signals indicating the q-axis corrected command voltage Vq*' and the d-axis corrected command voltage Vd*' are transmitted to a two-phase/three-phase coordinate conversion unit 58. The non-interacting correction value calculation unit 55 calculates the non-interacting correction value $-\omega \times (\phi a + La \times Id)$ and the non-interacting correction value $\omega \times La \times Iq$ for the q-axis command voltage Vq* and the d-axis command voltage Vd* based on the q-axis actual current Iq and the d-axis actual current Id and the angular speed $\omega$ of the rotor. The inductance La and the magnetic flux $\phi a$ are the constants set in advance. The calculation units 56 and 57 calculate the q-axis corrected command voltage Vq*' (=Vq*+ $\omega \times (\phi a + La \times Id)$) and the d-axis corrected command voltage Vd*' (=Vd*-$\omega \times La \times Iq$) by subtracting the non-interacting correction value $-\omega \times (\phi a + La \times Id)$ and the non-interacting correction value $\omega \times La \times Iq$ from the q-axis command voltage Vq* and the d-axis command voltage Vd*, respectively.

The two-phase/three-phase coordinate conversion unit 58 converts the q-axis corrected command voltage Vq*' and the d-axis corrected command voltage Vd*' into the three-phase command voltages Vu*, Vv* and Vw*, and transmits signals indicating the three-phase command voltages Vu*, Vv* and Vw* to a PWM voltage generation unit 59. The PWM voltage generation unit 59 transmits the PWM control voltage signals Uu, Vu and Wu that correspond to the three-phase command voltages Vu*, Vv* and Vw*, respectively, to the inverter 36. The inverter 36 produces the three-phase exciting voltage signals Vu, Vv and Vw that correspond to the PWM control voltage signals Uu, Vu and Wu, respectively, and transmits the exciting voltage signals Vu, Vv and Vw to the electric motor 20 through the three-phase exciting current paths. The current sensors 37a and 37b are provided on the respective two exciting current paths among the three-phase exciting current paths. The current sensors 37a and 37b detect the respective two exciting currents Iu and Iw among the three-phase exciting currents Iu, Iv and Iw for the electric motor 20, and transmits signals indicating the exciting currents Iu and Iw to a three-phase/two-phase coordinate conversion unit 60. A signal indicating the exciting current Iv calculated by a calculation unit 61 based on the actual currents Iu and Iw is also transmitted to the three-phase/two-phase coordinate conversion unit 60. The three-phase/two-phase coordinate conversion unit 60 converts the three-phase actual currents Iu, Iv and Iw to the two-phase actual currents Id and Iq.

The two-phase pulse train signals and the zero-phase pulse train signal from the rotational angle sensor 33 are sequentially transmitted to an electric angle conversion unit 62 at predetermined sampling intervals. The electric angle conversion unit 62 calculates the electric angle of the rotor with respect to the stator in the electric motor 20 based on the above-described pulse train signals, and transmits a signal indicating the electric angle to an angular speed conversion unit 63. The angular speed conversion unit 63 differentiates the electric angle to calculate the angular speed of the rotor with respect to the stator. The electric angle and the angular speed correspond to the rotational angle θ (the steering angle of the driver's steering wheel 11) and the angular speed ω (the steering angular speed of the driver's steering wheel 11) of the electric motor 20, respectively. Signals indicating the rotational angle θ and the angular speed ω are transmitted to the compensation value calculation portion 42, the field-weakening control parameter calculation unit 45, the two-phase/three-phase coordinate conversion unit 58, the three-phase/two-phase coordinate conversion unit 60, etc. and used by these units.

The assist ECU 40 further includes a power supply unit change-over command unit 64 that outputs a command to change the power supply unit based on the voltage Vout output from the electric power supply device 70. The electric power supply device 70 includes the main electric power supply unit 80 and the sub-electric power supply unit 90. The electric power supply device 70 is structured such that electric power is supplied to the electric motor 20 from one of these electric power supply units 80 and 90. The power supply unit change-over command unit 64 changes the electric power supply unit, from which electric power is supplied to the electric motor 20, based on the voltage Vout output from the electric power supply device 70.

When electric power is supplied to the electric motor 20 from the main electric power supply unit 80, the power supply unit change-over command unit 64 outputs an operation command to the voltage-decreasing circuit 82, and outputs an off-signal for turning off the change-over switch 94 of the sub-electric power supply unit 90. When electric power is supplied to the electric motor 20 from the sub-electric power supply unit 90, the power supply unit change-over command unit 64 outputs an operation stop command to the voltage-decreasing circuit 82, and outputs an on-signal for turning on the change-over switch 94 of the sub-electric power supply unit 90.

The power supply unit change-over command unit 64 usually causes the main electric power supply unit 80 to supply electric power to the electric motor 20. However, when a malfunction occurs in the main electric power supply unit 80 (abnormal voltage in the high-tension battery 81, breaking of wire, or a malfunction of the voltage-decreasing circuit 82) or when electric power supply through the output line 83 of the high-tension battery 81 is shut off due to a command to prohibit usage of the high-tension power supply unit, which is output from a hybrid control unit (not shown), the electric power supply unit for the electric motor 20 is changed to the sub-electric power supply unit 90. In this case, the electric motor 20 is supplied with electric power at a voltage lower than 48 V at which the electric motor 20 is driven appropriately. Accordingly, the electric motor 20 cannot rotate at a high speed. Therefore, the d-axis current correction coefficient calculation unit 47 corrects the d-axis target current Id* based on the voltage Vout output from the electric power supply device 70 to increase the field-weakening control amount.

Figure 10:
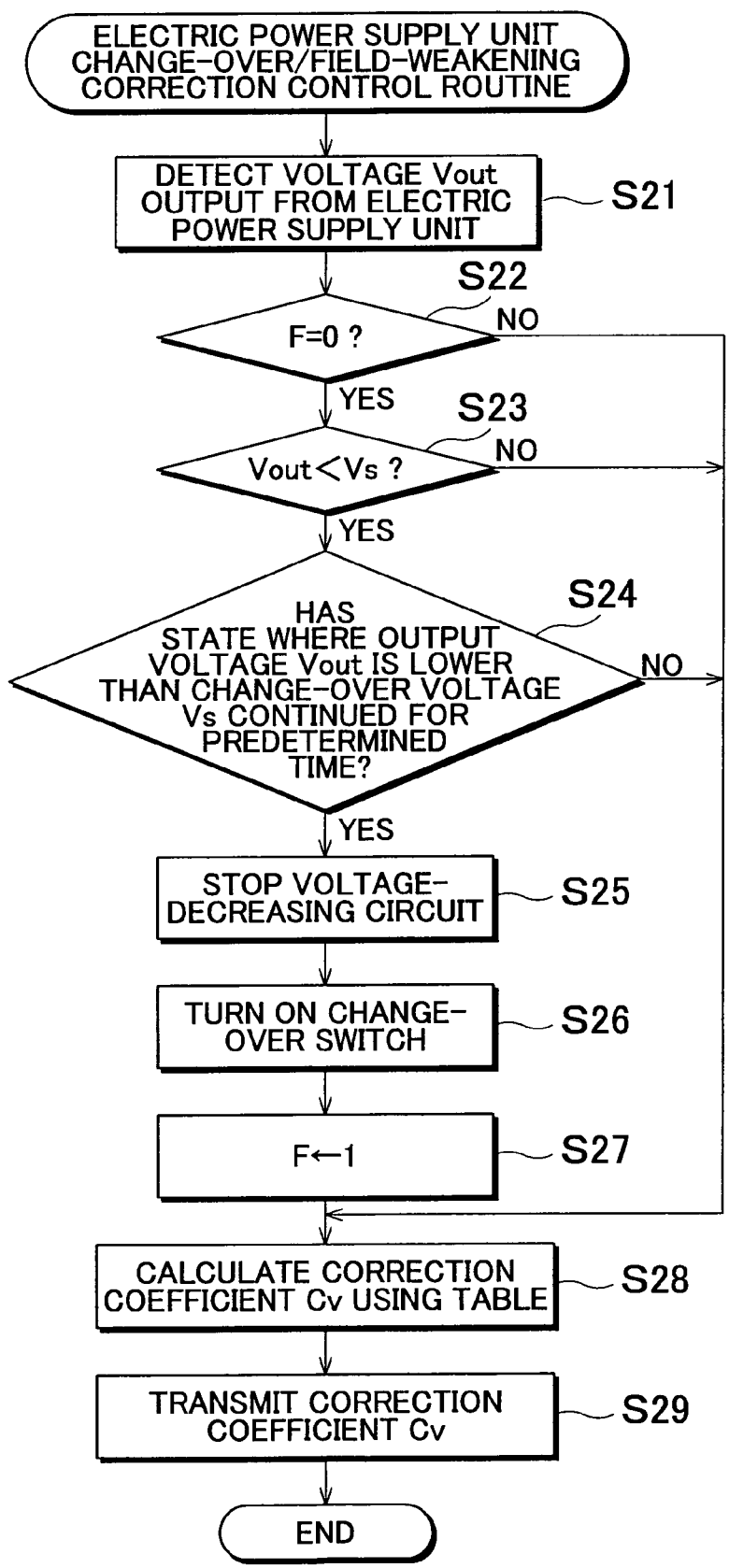
FIG. 10 is the flowchart showing the electric power supply unit change-over/field-weakening correction control routine.

The electric power supply unit change-over/field-weakening correction control routine that is executed by the power supply unit change-over command unit 64 and the d-axis current correction coefficient calculation unit 47 in a coordinated manner will be described below. FIG. 10 shows the electric power supply unit change-over/field-weakening correction control routine that is executed mainly by the power supply unit change-over command unit 64 and the d-axis current correction coefficient calculation unit 47 of the assist ECU 40. The control routine is stored in the ROM of the assist ECU 40 as the control program. The control routine is initiated in response to the operation for turning on the ignition switch, and periodically executed at short intervals. When the control routine is initiated, the voltage-decreasing circuit 82 of the main electric power supply unit 80 is operating, and the change-over switch 94 of the sub-electric power supply unit 90 is kept off.

When the control routine is initiated, the assist ECU 40 detects the voltage Vout output from the electric power supply device 70 based on a signal output from the voltage sensor 34 (S21). Next, the assist ECU 40 determines whether the flag F is set to 0 (S22). The flag F is set to 1 when the electric power supply unit for the electric motor 20 is being changed to the sub-electric power supply unit 90. At the initiation of the control routine, the flag F indicates 0. Accordingly, at the initiation of the control routine, step S23 is then executed. In step S23, it is determined whether the output voltage Vout is lower than the change-over voltage Vs. The change-over voltage Vs is used as the reference voltage to determine whether the electric power supply unit should be changed based on a decrease in the voltage Vout output from the electric power supply device 70. The change-over voltage Vs is stored in advance. In the embodiment of the invention, the change-over voltage Vs is set to 12 V. However, the change-over voltage Vs may be set to any value within the range from 12 V to 48 V.

If the main electric power supply unit 80 is operating properly, the output voltage Vout is 48 V. In this case, the output voltage Vout is equal to or higher than the reference voltage Vs. Accordingly, a negative determination is made in step S23, and step S28 is executed without executing steps S24 to S27. Step S28 is executed by the d-axis current correction coefficient calculation unit 47. In step S28, the correction coefficient Cv is calculated using the correction coefficient calculation table shown in FIG. 7. If the main electric power supply unit 80 is operating properly, the voltage Vout output from the electric power supply device 70 is equal to or higher than the reference voltage Vr1 (for example, 30 V). Accordingly, the correction coefficient Cv is set to 1. Next, a signal indicating the calculated correction coefficient Cv (Cv=1) is transmitted to the d-axis target current correcting calculation unit 48 in step S29, after which the control routine ends. Accordingly, the field-weakening control amount is not actually corrected.

Because the control routine is periodically executed, the voltage Vout output from the electric power supply device 70 is constantly monitored. Accordingly, as shown in the correction coefficient calculation table in FIG. 7, when the output voltage Vout is maintained equal to or higher than the reference voltage Vr1, the correction coefficient is maintained at 1. Even before the voltage Vout output from the electric power supply device 70 is decreased to the change-over voltage Vs, if the output voltage Vout falls below the reference voltage vr1, the correction coefficient Cv is set to a value greater than 1 in step S28. Accordingly, the field-weakening control amount is increased.

If the voltage Vout output from the electric power supply device 70 (the main electric power supply unit 80) falls below the change-over voltage Vs while the output voltage Vout is monitored, an affirmative determination is made in step S23, and step S24 is then executed.

The high-tension battery 81 is provided mainly to supply electric power to the motor used to drive a hybrid system. The high-tension battery 81 is used also as the electric power supply unit for the electric motor 20 of the electric power steering apparatus. In such electric power supply system, a hybrid controller (not shown) that executes control over the hybrid system gives permission for usage of the high-tension battery 81. When a command to prohibit usage of the high-tension battery 81 is output from the hybrid controller, a power supply relay (not shown) provided on the output line 83 of the high-tension battery 81 is turned off, whereby electric power supply from the main electric power supply unit 80 is shut off. The voltage output from the main electric power supply unit 80 may fall below the change-over voltage Vs due to capacity shortage of the high-tension battery 81, breaking of the power supply line, a malfunction of the voltage-decreasing circuit 82, etc.

In such a case, an affirmative determination is made in step S23. If an affirmative determination is made in step S23, the assist ECU 40 executes step S24. In step S24, the assist ECU 40 determines whether the state where the output voltage Vout is lower than the change-over voltage Vs has continued for a predetermined time. If it is determined that such state has not continued for the predetermined time, step S28 is executed. The predetermined time is set, for example, to approximately 500 milliseconds. If a decrease in the output voltage Vout is instantaneous, the output voltage Vout returns to the voltage before decrease within the predetermined time even if the output voltage Vout falls below the change-over voltage Vs. However, if the state in which the output voltage Vout is lower than the change-over voltage Vs has continued for the predetermined time, step. S25 and the following steps are executed.

In step S25, a command to stop the operation is output from the power supply unit change-over command unit 64 to the voltage-decreasing circuit 82. Accordingly, the operation of the voltage-decreasing circuit 82 to decrease the voltage is stopped, and electric power supply from the main electric power supply unit 80 to the electric motor 20 is shut off. Next, an on-signal is transmitted from the power supply unit change-over command unit 64 to the change-over switch 94 of the sub-electric power supply unit 90 in step S26. Accordingly, the electric power supply circuit extending from the sub-power supply unit 90 to the electric motor 20 is formed. In this case, because the operation of the main electric power supply unit 80 is stopped, the electric current does not flow back from the main electric power supply unit 80 to the sub-electric power supply unit 90.

Next, the flag F is set to 1 in step S27. Then, the correction coefficient Cv is calculated in step S28. In this case, the voltage Vout output from the electric power supply device 70 is 12 V that is the voltage output from the sub-electric power supply unit 90. Therefore, the correction coefficient Cv calculated by the d-axis current correction coefficient calculation unit 47 is set to a value greater than 1. For example, when the reference voltage Vr2 is set to 12 V in the correction coefficient calculation table shown in FIG. 7 (Vr2=12V), the correction coefficient Cv is set to the maximum value (for example, Cv=2). When the sub-electric power supply unit 90 is used as the electric power supply unit for the electric motor 20, the correction coefficient Cv is set to a value greater than the correction coefficient Cv used when the main electric power supply unit 80 is used. A signal indicating the calculated correction coefficient Cv is transmitted to the d-axis target current correcting calculation unit 48 in step S29.

Accordingly, when the sub-electric power supply unit 90 is used, the field-weakening control amount is increased by a larger amount than when the main electric power supply unit 80 is used.

After the assist ECU 40 executes step S29, the control routine ends. Then, the assist ECU 40 periodically executes the control routine at predetermined intervals. In this case, because the flag F is set to 1, after the electric power supply unit for the electric motor 20 is changed from the main electric power supply unit 80 to the sub-electric power supply unit 90, the electric power supply unit is not changed until the control routine is initiated again (until the ignition switch is turned on again). For example, the voltage output from the high-tension battery 81 is sometimes returned to the voltage before decrease. In such a case, electric power may not be stably supplied from the high-tension battery 81. If return of the voltage output from the high-tension battery 81 to the voltage before decrease is detected and the electric power supply unit is changed from the sub-electric power supply unit 90 to the main electric power supply unit 80, the output voltage may decrease at the instant of such change of the electric power supply unit. In the embodiment of the invention, after the electric power supply unit is changed from the main electric power supply unit 80 to the sub-electric power supply unit 90, usage of the sub-electric power supply unit 90 is maintained.

Figure 11:
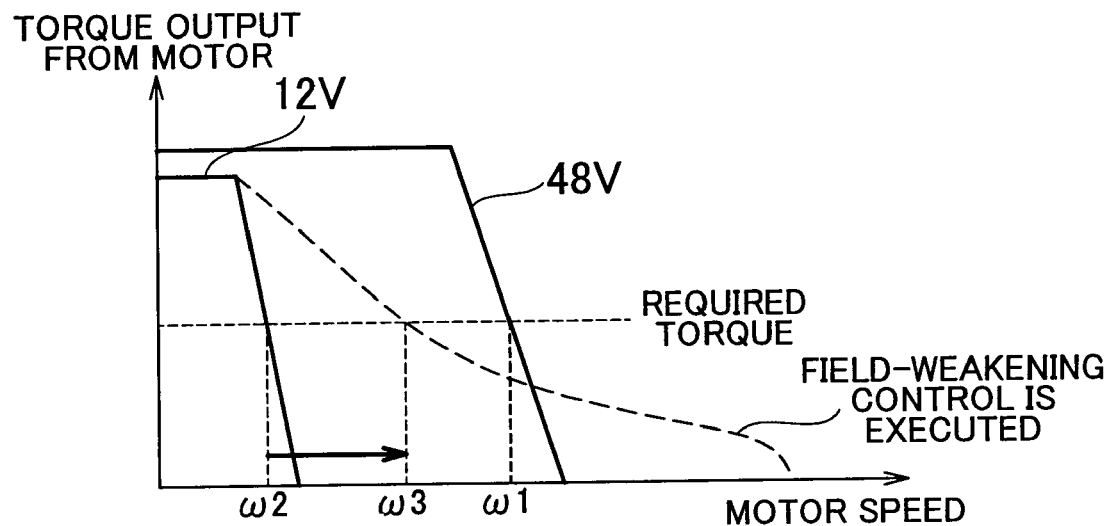
FIG. 11 is the graph showing the relationship between the motor speed of the electric motor and the torque output from the electric motor.
Figure 12:
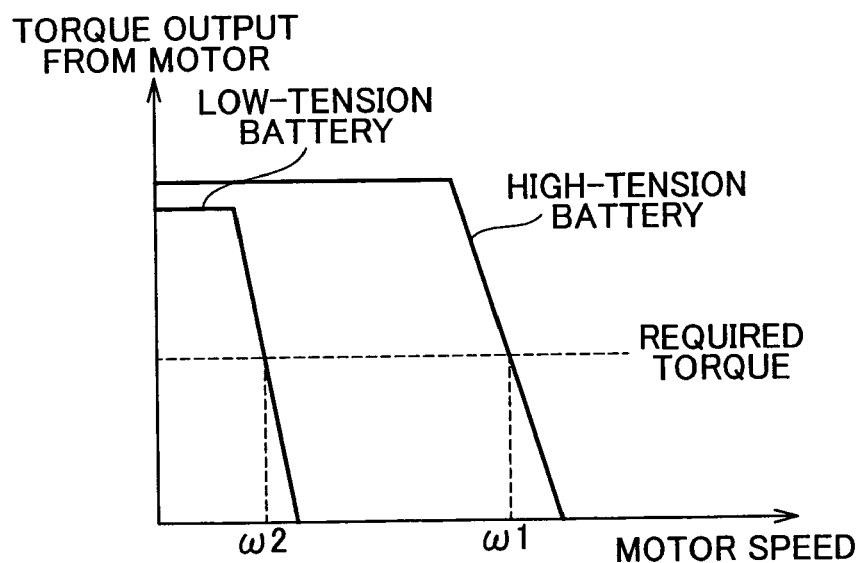
FIG. 12 is the graph showing the relationship between the motor speed of the electric motor and the torque output from the electric motor.

FIG. 11 is the graph showing the relationship between the motor speed and the torque output from the motor. In FIG. 11, the solid lines indicate two respective relationships realized when the electric motor is driven at 12 V and 48 V without executing the field-weakening control, and the dashed line indicates the relationship realized when the electric motor is driven at 12 V while the field-weakening control is executed. As shown in FIG. 11, when the field-weakening control is not executed, the motor speed at which the required torque is produced considerably decreases if the voltage at which the electric motor is driven is low. In the example shown in FIG. 11, the motor speed when the electric motor is driven at 12 V is decreased to the motor speed ω2 that is considerably lower than the motor speed ω1 when the electric motor is driven at 48 V.

In contrast, when the electric motor is driven while the field-weakening control is executed, even if the voltage at which the electric motor is driven is 12 V, the motor speed is increased to the motor speed ω3. In the embodiment of the invention, when electric power is supplied to the electric motor 20 from the sub-electric power supply unit 90, the field-weakening control amount is increased by correcting the d-axis target current, whereby the relationship shown by the dashed line is realized. Accordingly, even when electric power is supplied from the sub-electric power supply unit 90, the motor speed is increased to the motor speed ω3.

With the assist ECU 40 described so far, rotation of the electric motor 20 is controlled by executing the vector control indicated by the two-phase rotating flux coordinate system where the direction in which the electric motor 20 rotates is used as the q-axis and the direction perpendicular to the direction in which the electric motor 20 rotates is used as the d-axis. In the vector control, the d-axis target current calculation unit 46 calculates the d-axis target current Id* based on the first to third parameters Cw, Cq and Ci calculated by the field-weakening control parameter calculation unit 45, and executes the field-weakening control on the d-axis current of the electric motor 20 based on the angular speed ω, the q-axis command voltage Vq and the q-axis actual current Iq. Accordingly, the more compact, higher-powered and higher-performance electric motor 20 is implemented, and an unnecessary field-weakening current is prevented from flowing.

In addition, the d-axis target current Id* is corrected based on the voltage Vout output from the electric power supply device 70. Namely, the d-axis current correction coefficient calculation unit 47 calculates the correction coefficient Cv based on the output voltage Vout, and the d-axis target current correcting calculation unit 48 multiples the d-axis target current Id* by the correction coefficient Cv, thereby setting the corrected d-axis target current Id*' as the final field-weakening control amount. Therefore, even when the sub-electric power supply unit 90 is used as the backup electric power supply unit, the electric motor 20 rotates at an appropriate speed, and the response to the steering operation performed by the driver improves. Accordingly, even if the driver turns the driver's steering wheel quickly, the electric motor 20 does not become a resistance. As a result, it is possible to suppress a decrease in the steering feel.

In addition, a general-purpose 12-V battery, which is used to supply electric power to various loads arranged within the vehicle, is used as the backup electric power supply unit for the main electric power supply unit 80. Accordingly, the backup electric power supply unit for the main electric power supply unit 80 is implemented at a low cost. For example, if an electric power supply unit that outputs a voltage substantially equal to the voltage output from the main electric power supply unit 80 is prepared as the backup electric power supply unit for the main electric power supply unit 80, the electric motor 20 is driven at an appropriate speed even when the backup electric power supply unit is used. In this case, another high-tension battery needs to be prepared. When a low-tension battery is used as the backup electric power supply unit, a voltage-increasing circuit needs to be provided. Provision of the voltage-increasing circuit to increase the voltage output from the backup electric power supply unit causes a cost increase. In addition, if the voltage-increasing circuit is provided, a space for the voltage-increasing circuit needs to be created, and a radiator plate that radiates the heat generated by increasing the voltage needs to be provided.

In contrast, according to the embodiment of the invention, correcting the field-weakening control amount makes it possible to use the low-tension battery 91 as the backup electric power supply unit. As a result, inconveniences such as increases in cost and size of the apparatus are not caused.

Even when regenerative electric power is generated by the electric motor 20 while electric power is supplied to the electric motor 20 from the sub-electric power supply unit 90, regenerative electric power is absorbed by the protection circuit 93. Accordingly, it is possible to protect various electric loads that are supplied with electric power from the low-tension battery 91. In addition, because the protection circuit 93 is formed of a zener diode, a control circuit is not required, which makes it possible to implement the protection circuit 93 at a low cost. Even when the sub-electric power supply unit 90 is used, the absorption circuit (not shown) provided in the voltage-decreasing circuit 82 of the main electric power supply unit 80 may be kept operated to absorb the regenerative electric power.

In addition, the field-weakening control amount (d-axis target current) is corrected based on the output voltage Vout regardless of which of the electric power supply units of the electric power supply device 70 is used. Accordingly, the field-weakening control need not be changed depending on which of the electric power supply units is used, which facilitates execution of the control.

Because the upper limit value for the d-axis current, which is used when the field-weakening control amount is increased, is set, it is possible to prevent a decrease in the magnetic force of the permanent magnets of the electric motor 20. In addition, because the high-tension battery 81 used for the hybrid system is used also as the electric power supply unit for the electric power steering apparatus, the electric power supply unit outputs a voltage at which the electric motor 20 is appropriately driven. Accordingly, it is possible to implement the higher-powered and higher-performance electric power steering apparatus.

While the electric power steering apparatus according to the embodiment of the invention has been described, the invention is not limited to the embodiment described above. The invention may be realized in various other embodiments within the scope of the invention. For example, in the embodiment of the invention, the determination as to whether the electric power supply unit is changed is made based on the voltage output from the electric power supply device 70 (refer to step S23 in FIG. 10). Alternatively, the voltage output from the main electric power supply unit 80 and the voltage output from the sub-electric power supply unit 90 may be compared with each other. When the voltage output from the main electric power supply unit 80 falls below the voltage output from the sub-electric power supply unit 90, the electric power supply unit for the electric motor 20 may be changed from the main electric power supply unit 80 to the sub-electric power supply unit 90. Alternatively, a diode may be provided instead of the change-over switch 94, and the electric power supply unit which outputs a higher voltage may be automatically selected as the electric power supply unit for the electric motor 20. In this case, the diode is arranged so that the anode faces the low-tension battery 19 and an electric current flows only toward the load. Also, when the voltage input in the voltage-decreasing circuit 82 falls below a predetermined voltage, the electric power supply unit for the electric motor 20 may be changed from the main electric power supply unit 80 to the sub-electric power supply unit 90.

The d-axis correction coefficient calculation unit 47 and the d-axis target current correcting calculation unit 48 of the assist ECU 40 according to the embodiment of the invention may be regarded as a motor speed compensation unit according to the invention. The upper limit setting unit 49 of the assist ECU 40 according the embodiment of the invention may be regarded as a magnetic force decrease prevention unit according to the invention. The power supply unit change-over command unit 64 of the ECU 40 according to the embodiment of the invention may be regarded as an electric power supply unit change-over control unit according to the invention. The units 41 to 63 except the calculation units 47 and 48, the upper limit setting unit 49 and the power supply unit change-over command unit 64 may be regarded as a vector control unit according to the invention.

While the invention has been described with reference to what are considered to be an example embodiment thereof, it is to be understood that the invention is not limited to the described embodiment or constructions. On the contrary, the invention is intended to cover various modifications and equivalent arrangements. In addition, while the various elements of the described invention are shown in various combinations and configurations, which are exemplary, other combinations and configurations, including more, less or only a single element are also within the scope of the appended claims.

The invention claimed is:

1. An electric power steering apparatus, comprising:
a steering mechanism that steers steering wheels in response to a steering operation of a driver's steering wheel;
an electric motor that is fitted to the steering mechanism and that rotates using electric power supplied from an electric power supply device to generate a force used to assist the steering operation; and
a motor control unit that controls an operation of the electric motor based on a manner in which the steering operation of the driver's steering wheel is performed, wherein
the electric power supply device includes at least two electric power supply units connected in parallel, which are a main electric power supply unit and a sub-electric power supply unit that outputs a voltage lower than a voltage output from the main electric power supply unit, the electric power supply device being structured such that electric power is supplied to the electric motor from one of the main electric power supply unit and the sub-electric power supply unit, and
the motor control unit includes:
a vector control unit that controls rotation of the electric motor by executing vector control indicated by a two-phase rotating flux coordinate system where a direction in which the electric motor rotates is used as a q-axis and a direction perpendicular to the direction in which the electric motor rotates is used as a d-axis; and
a motor speed compensation unit that increases, when electric power is supplied to the electric motor from the sub-electric power supply unit, a d-axis current used as a field-weakening control current by a larger amount than when electric power is supplied to the electric motor from the main electric power supply unit so that a decrease in a motor speed due to a decrease in a voltage output from the electric power supply device is suppressed.

2. The electric power steering apparatus according to claim 1, wherein
a sub-electric power output line of the sub-electric power supply unit is provided with a switching unit that permits or shuts off electric power supply through the sub-electric power output line, and a protection circuit that is provided between the switching unit and the sub-electric power supply unit and that prevents an increase in a voltage of the sub-electric power output line.

3. The electric power steering apparatus according to claim 2, wherein
the main electric power supply unit includes a high-tension battery having a first voltage and a voltage-decreasing circuit that decreases the first voltage output from the high-tension battery, and outputs a voltage obtained by decreasing the first voltage,
the sub-electric power supply unit includes a low-tension battery having a second voltage that is lower than the voltage that is obtained by decreasing the first voltage output from the main electric power supply unit, and outputs the second voltage, and
electric power is supplied to the electric motor from one of the main electric power supply unit and the sub-electric power supply unit.

4. The electric power steering apparatus according to claim 3, further comprising:
an electric power supply unit change-over control unit that starts an operation of the voltage-decreasing circuit of the main electric power supply unit and turns off the switching unit of the sub-electric power supply unit when electric power is supplied to the electric motor from the main electric power supply unit, and that stops the operation of the voltage-decreasing circuit of the main electric power supply unit and turns on the switching unit of the sub-electric power supply unit when electric power is supplied to the electric motor from the sub-electric power supply unit.

5. The electric power steering apparatus according to claim 1, further comprising:
a supply voltage detection unit that detects a voltage output from the electric power supply device,
wherein
the motor speed compensation unit controls a supply amount of d-axis current used as the field-weakening control current based on the voltage detected by the supply voltage detection unit.

6. The electric power steering apparatus according to claim 1, further comprising:
a magnetic force decrease prevention unit that sets an upper limit value for the d-axis current to prevent a decrease in a magnetic force of a permanent magnet of the electric motor.

7. A method for controlling an electric power steering apparatus including a steering mechanism that steers steering wheels in response to a steering operation of a driver's steering wheel; an electric motor that is fitted to the steering mechanism and that rotates using electric power supplied from an electric power supply device to generate a force used to assist the steering operation; and a motor control unit that controls an operation of the electric motor based on a manner in which the steering operation of the driver's steering wheel is performed, comprising
supplying electric power to the electric motor from one of at least two electric power supply units which are included in the electric power supply device, which are connected in parallel, and which include a main electric power supply unit and a sub-electric power supply unit that outputs a voltage lower than a voltage output from the main electric power supply unit;
controlling, using the motor control unit, rotation of the electric motor by executing vector control indicated by a two-phase rotating flux coordinate system where a direction in which the electric motor rotates is used as a q-axis and a direction perpendicular to the direction in which the electric motor rotates is used as a d-axis; and
increasing, using the motor control unit, when electric power is supplied to the electric motor from the sub-electric power supply unit, a d-axis current used as a field-weakening control current by a larger amount than when electric power is supplied to the electric motor from the main electric power supply unit so that a decrease in a motor speed due to a decrease in a voltage output from the electric power supply device is suppressed.

* * * * *